E. J. & L. B. JONES.
APPARATUS FOR MANUFACTURING GAS.
APPLICATION FILED MAY 23, 1912.
1,089,926.
Patented Mar. 10, 1914.
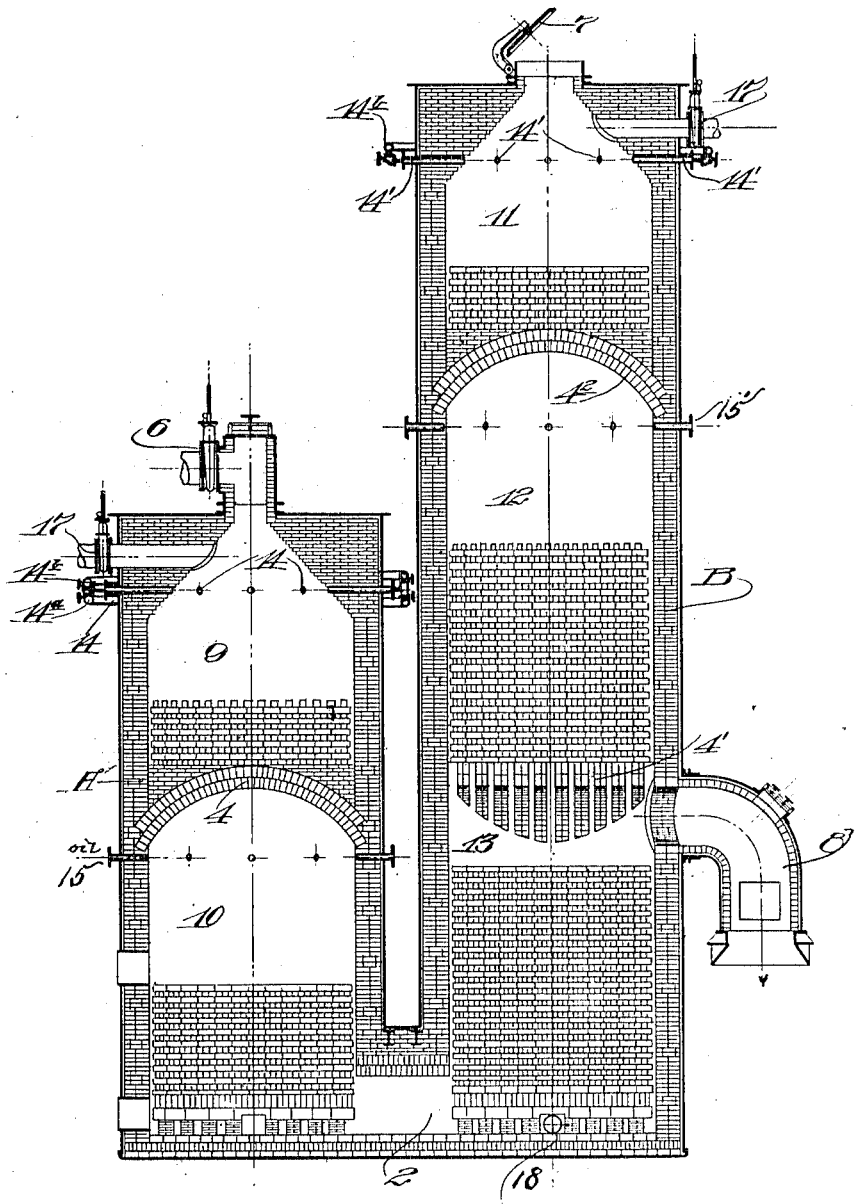

UNITED STATES PATENT OFFICE.

EDWARD C. JONES AND LEON B. JONES, OF SAN FRANCISCO, CALIFORNIA.

APPARATUS FOR MANUFACTURING GAS.

1,089,926.  Specification of Letters Patent.  Patented Mar. 10, 1914.

Application filed May 23, 1912. Serial No. 699,131.

*To all whom it may concern:*

Be it known that we, EDWARD C. JONES and LEON B. JONES, citizens of the United States, residing in the city and county of San Francisco and State of California, have invented new and useful Improvements in Apparatus for Manufacturing Gas, of which the following is a specification.

This invention relates to an apparatus for manufacturing illuminating gas from crude or other oil, and constitutes the generator portion of a gas set.

The invention consists of an apparatus for manufacturing illuminating gas from oil; the object of the invention being to provide an apparatus which shall be more economical in the use of oil than any now in use, and which shall either wholly or in great part dispense with the making of the considerable quantities of lampblack which now occurs as a residual product.

The apparatus also includes novel features which permit of more elasticity in the operation, increases the capacity and produces gas of greater uniformity.

In the manufacture of oil gas for commercial purposes, like in a municipal gas works, it is customary to bring oil mixed with saturated steam in contact with highly heated refractory material, such as fire brick contained in apparatus consisting of either single or double shell generators. After the heating of such apparatus is completed, the voids between the fire brick, and the chambers immediately above and below the fire brick, are filled with gases which are products of combustion of the heating process. When oil, mixed with saturated steam is sprayed into these generators for the purpose of making gas, the presence of the products of combustion and the wet steam interfere with the proper and economical destructive distillation of the oil into merchantable gas.

In the present process of manufacturing gas from crude oil, or its derivatives, alone, the so called cracking or the destructive distillation of the oil by high temperatures, generally between 2000°–2600° Fahrenheit, takes place in a preheated atmosphere containing deleterious combustion products such as carbon dioxid, nitrogen, etc., which non-combustible, non-heat producing, non-light producing products are in no sense a benefit to the final gas product. Further than this there is a wasteful production of uncommercial lampblack or free carbon following the cracking of the oil. On the other hand we have discovered that an entirely different result is obtained when the cracking or destructive distillation of the crude oil, or its derivatives, takes place initially and is continued in an atmosphere of active heat or light-producing gas, such as hydrogen, carbon monoxid, or a mixture of both, or any other beneficial gases which might perform the same service, including natural gas, or manufactured illuminating gas. By employing such active beneficial gases supplied from a source independent of the oil undergoing treatment, and which gases act as a catalyzing agent, and cracking the oil in an atmosphere of such gas, or gases, in combination with steam, preferably superheated, and sufficient to satisfy the freed carbon of the oil, a far larger amount of the carbon in the oil is converted into desirable gas, and the small portion not gasified appears as tar, a complex hydro-carbon product more desirable commercially than lampblack.

The apparatus constituting the subject matter of the present application is illustrated in the accompanying drawing, in which the view shown is a sectional elevation of the device.

This apparatus consists of two generators A and B, cylindrical in shape; one generator B being much longer than the other and connected at the bottom by a rectangular throat piece 2. These generators are lined with fire brick or other refractory material and are so divided, by arches as to form chambers 9, 10, 11, 12, and 13; and the space between the chambers is loosely piled with checker work of firebrick, or other refractory material which acts as reservoirs of heat. At the top of the short shell A is located a valve 6, for the admission of air under pressure to aid combustion of oil used for heating the apparatus. At or near the middle of the longer generator B is located the common outlet 8, for gas from both generators. At the top of the longer generator B is located a stack valve 7, for the escape of the products of combustion from the oil used to heat the apparatus.

At the bottom of the generator B is located an opening 18 suitably controlled by a valve, not shown, for the admission of air during the heating period for the better control of the heat.

The operation of our invention is as follows: The interior checker work and chambers of the apparatus are first heated to gas making temperature by suitable means, preferably by the combustion of oil admitted through pipe 14 from pipe 14ª, to the top of the short generator A; sufficient air for combustion being admitted through valve 6. During this heating operation the gas outlet 8 is closed by a suitable hydraulic seal, not shown, and the stack valve 7 is opened to allow for the escape of the products of combustion. The resultant heat is transmitted to and stored in the checker brick and arches contained in the apparatus until the temperature reaches a point suitable for the destructive distillation of oil, preferably 1900° to 2500° Fahrenheit. Valve 6 is then closed, thereby shutting off the air for combustion, the oil for heating is shut off at pipes 14 and valve 7 is closed. The apparatus is then ready to make gas. During the heating process, oil is wholly or partly consumed in chamber 9 and a by-product of the combustion composed of carbon and generally known as lampblack, is deposited upon the checker brick sustained by the arches 4, 4′, and 4².

To make illuminating gas, an active gas such as hydrogen, or a mixture of hydrogen and carbon monoxid, is brought from some suitable source through pipes 17—17′ into chambers 9 and 11, in company with sufficient steam through pipes 14—14′ from pipe 14ᵇ, and passing downward replaces the deleterious products of combustion (left in the generator from the heating operation) and form an initial and continuous superheated atmosphere to act as a catalyzing agent for the destructive distillation of oil in chambers 10 and 12; or, steam alone may be injected into chambers 9 and 11 through pipes 14—14′, some of which is dissociated in the presence of the incandescent carbon remaining upon the checker work, from the previous combustion of oil for heating the apparatus. The blue water gas formed in this way together with the remaining steam in a highly superheated condition, enters chambers 10 and 12 and produces an initial and continuous hydrogen atmosphere to act as a catalyzing agent upon the destructive distillation of oil in these chambers; or, natural gas or manufactured gas, together with sufficient steam may be admitted from some outside source into chambers 9 and 11 to produce the desired catalytic atmosphere in chambers 10 and 12. The hydrocarbons of such gases will be broken down and recombined in the presence of the incandescent carbon remaining on the checker work from the combustion of the previous heating operation, into suitable gases for the successful carrying out of our invention and passing downward into chambers 10 and 12 will form an initial and continuous catalytic atmosphere, or an atmosphere acting as a catalyzing agent for the destructive distillation of oil in chambers 10 and 12.

The inert gases of combustion resulting from the preliminary heating of the apparatus being displaced by the active catalyzing atmosphere, which atmosphere, it is to be understood, is maintained during the gas making period, hot oil is then injected through pipes 15—15′, preferably in a finely atomized state, and this oil, decomposing in the presence of the hydrogen and carbon monoxid and superheated steam, passes downward through the checker brick in the bottom of the short shell A through throat-piece 2, and upward through the checker brick at the bottom of the long shell into chamber 13, thence through the outlet pipe 8 through said suitable hydraulic seal. At the same time oil is admitted through pipes 15′ into chamber 12 where it is decomposed in the catalytic atmosphere prevalent in the checker brick sustained by arch 4², and passes downward through checker brick sustained by arch 4′ where the gas is fixed, and passes downward into chamber 13 then out through outlet elbow 8 through the aforesaid suitable hydraulic seal.

It is understood that after a certain length of time the apparatus cools, whereupon there follows a heating period, as first described; the heating and gas making periods continuing alternately in the regular cycle of operation.

The advantages claimed and shown by practical use are: By using two shells, one shell preferably longer than the other and connected at the bottom by a throat-piece and having a gas outlet at or near the middle of the second shell, the making of gas in two directions may be carried on simultaneously, and making use of the heat stored in the checker brick above said outlet. The arches placed in these shells are for the purpose of separating the refractory material or checker brick so that the upper portion of each shell may be used for the purpose of superheating steam and making blue water gas.

By disassociation of a portion of the steam in combination with the incandescent carbon remaining on the checker work and the other portions of the chambers 10 and 12, from the previous heating operations, forms an atmosphere of superheated steam and blue water gas into which atmosphere the oil is subsequently admitted to be decomposed.

The checker brick sustained by arches 4—4² operates to accumulate lampblack from the partially decomposed oil used in the heating period for superheating steam and the generation of blue water gas in the gas making period; or, for the decomposition of illuminating gas or natural gas supplied to the chamber above the checker work under pressure and decomposed by passing through said checker work; thereby making a gas mainly consisting of hydrogen which acts as a catalytic agent during the destructive distillation of oil below the arches sustaining said checker work.

The primary blast valve 6, supplies air for the combustion oil for heating the apparatus, and the secondary blast valve 18, at the bottom of the second shell, allows for the admission of air for the combustion of any combustible products not consumed in the first shell, and passing over into the second shell.

Having thus described our invention, what we claim and desire to secure by Letters Patent, is—

1. A gas generator consisting in combination of two shells, one longer than the other, the said shells being connected at their lowermost portions by a throat piece, both shells being lined with refractory material and so divided by open arches as to sustain checker work to form a plurality of superposed chambers within the shell, the shorter shell being provided with two sets of checker work, the longer shell being provided with three sets of checker work, the lowermost chamber in the shorter shell being for the purpose of destructive distillation, and an intermediate chamber in the longer shell being also for the purpose of destructive distillation, said chambers for destructive distillation being provided with oil inlets, the upper chamber of both shells being provided with openings for the admission of steam and gas, the lowermost chamber in the longer shell being provided with a common gas outlet for both the longer shell and the shorter shell, an air inlet in the upper portion of the shorter shell, and an outlet for the products of combustion in the upper portion of the longer shell.

2. A gas generator comprising two shells of different length, said shells being connected by a throat piece at their lowermost portions, a lining of refractory material in each of the shells, a series of open arches in each of the shells so located as to divide the shorter shell into two and the longer shell into three substantially equal chambers, checker brick construction in each of the chambers, oil, air and steam inlets in the upper chamber of the shorter shell, an inlet in the lower chamber of the shorter shell to admit the oil to be dissociated, a common gas outlet for both shells in the lower chamber of the larger shell, a secondary air blast opening near the bottom thereof, a stack opening in the top of the longer shell, openings for oil, gas and steam in the upper chamber corresponding to those in the upper chamber of the shorter shell, and an inlet for the crude oil located in the upper portion of the middle chamber of the longer shell.

In testimony whereof we have hereunto set our hands in the presence of two subscribing witnesses.

EDWARD C. JONES.
LEON B. JONES.

Witnesses:
J. G. BUBB,
A. H. CONCE.